United States Patent [19]
Reum et al.

[11] Patent Number: 5,438,804
[45] Date of Patent: Aug. 8, 1995

[54] LANDSCAPE EDGING

[75] Inventors: Donald J. Reum, Bonita Springs, Fla.; Mark Reum, Albany, Minn.

[73] Assignee: Avon Plastics, Inc., Albany, Minn.

[21] Appl. No.: 254,652

[22] Filed: Jun. 3, 1994

Related U.S. Application Data

[63] Continuation of Ser. No. 126,426, Sep. 24, 1993, abandoned, which is a continuation of Ser. No. 994,080, Dec. 16, 1992, abandoned, which is a continuation of Ser. No. 879,547, May 4, 1992, abandoned, which is a continuation of Ser. No. 754,142, Aug. 30, 1991, abandoned, which is a continuation of Ser. No. 634,804, Dec. 28, 1990, abandoned, which is a continuation of Ser. No. 414,713, Sep. 29, 1989, abandoned.

[51] Int. Cl.⁶ .......................... A01G 1/08; F21V 21/00
[52] U.S. Cl. ...................... 52/102; 52/104; 47/33; 362/249
[58] Field of Search ............ 52/101, 102 OR, 103, 52/104; 47/33; 404/8, 65; 362/249, 806, 188

[56] References Cited

U.S. PATENT DOCUMENTS

| | | | |
|---|---|---|---|
| 3,180,238 | 4/1965 | Crone | 404/48 |
| 3,387,786 | 6/1968 | Rynberk | 47/33 |
| 4,281,473 | 8/1981 | Emalfarb et al. | 47/33 |
| 4,644,685 | 2/1987 | Tisbo et al. | 47/33 |
| 4,761,923 | 8/1988 | Reum et al. | 52/102 |
| 5,238,425 | 8/1993 | Kliewer | 362/249 X |
| 5,297,013 | 3/1994 | Hall et al. | 362/249 X |

FOREIGN PATENT DOCUMENTS

| | | | |
|---|---|---|---|
| 1422293 | 11/1965 | France | 47/33 |
| 2839261 | 3/1980 | Germany | 47/33 |
| 2918152 | 11/1980 | Germany | 47/33 |

OTHER PUBLICATIONS

Edg-King Lawn Edging—Trade Show Jul. 28, 1981.

*Primary Examiner*—Wynn E. Wood
*Attorney, Agent, or Firm*—Merchant, Gould, Smith, Edell, Welter & Schmidt

[57] ABSTRACT

Landscape edging is disclosed having a body member of predetermined length, height and thickness, with a top tubular rail member extending longitudinally along the top portion of the body member and an anchor member extending longitudinally over the bottom portion of the body member. The anchor member takes the form of a triangle when viewed in transverse section, which is disposed in an inverted position with a point of the triangle directed downward for insertion into the ground, and with anchoring portions projecting laterally outward from opposite faces of the body member.

13 Claims, 2 Drawing Sheets

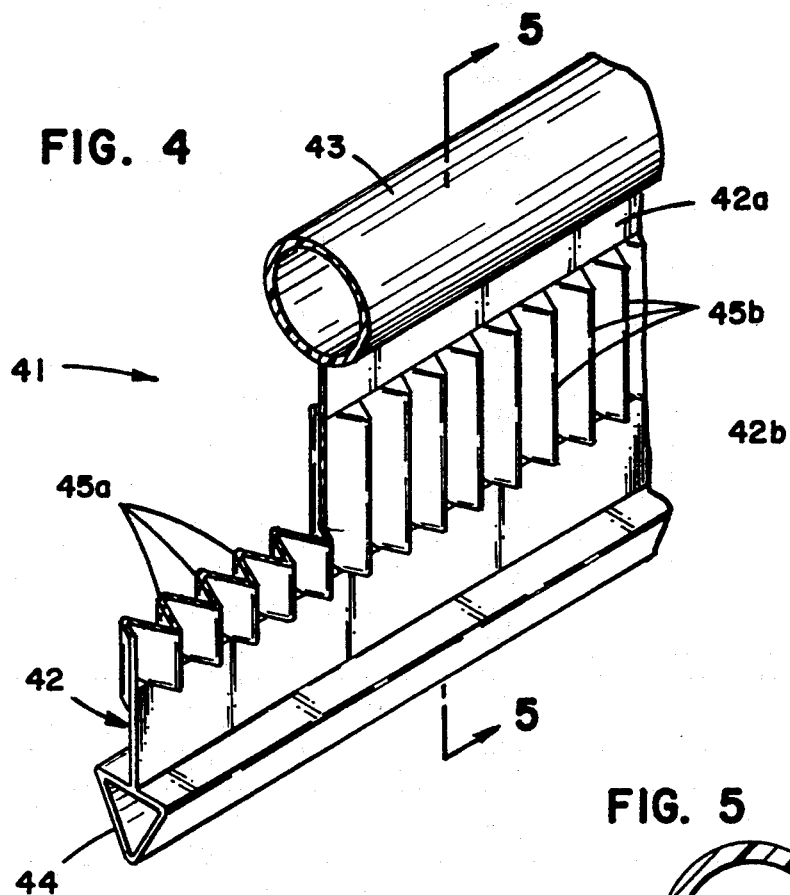
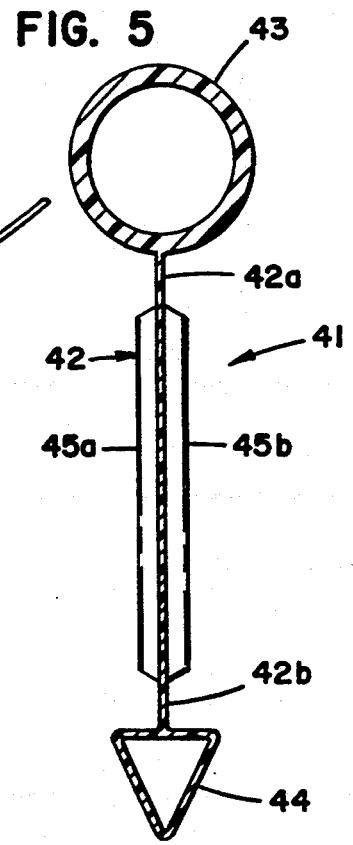
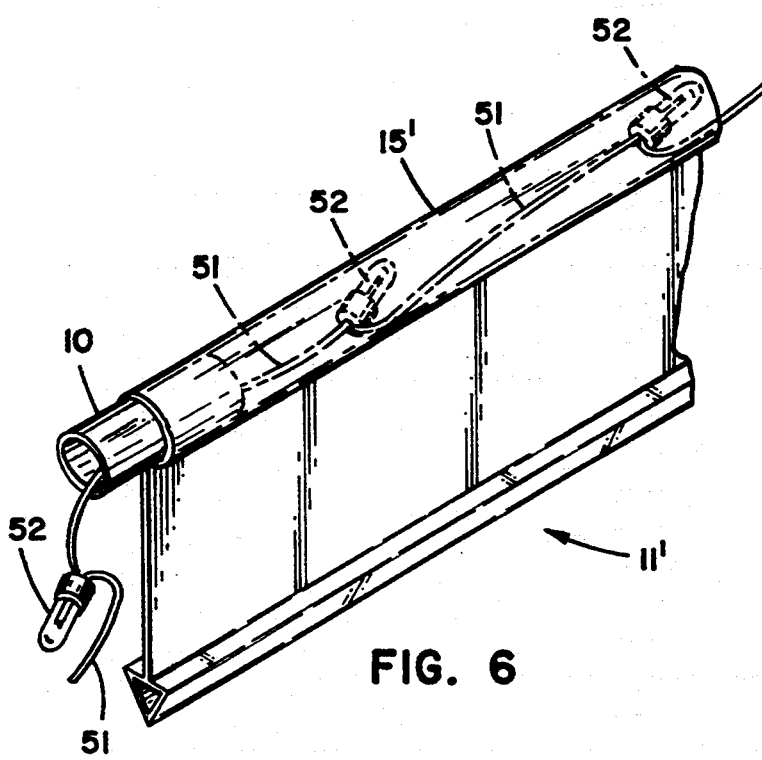

LANDSCAPE EDGING

This is a continuation of application Ser. No. 08/126,149, filed Sep. 24, 1993, which is a continuation of application Ser. No. 07/994,080, filed Dec. 16, 1992, which is a continuation of application Ser. No. 07/879,547, filed May 4, 1992, which is a continuation of application Ser. No. 07/754,142, filed Aug. 30, 1991, which is a continuation of application Ser. No. 07/634,804, filed Dec. 28, 1990, which is a continuation of application Ser. No. 07/414,713, filed Sep. 29, 1989.

The invention is directed to landscape edging used as a barrier between landscaped areas of different composition.

Landscape edging is now commonly used to divide different landscape areas to preclude one area from spilling or growing into an adjacent area. For example, landscape edging is effectively used as a divider between grass and a flower bed to prevent the grass from taking root in the flower bed, and also to prevent bedding material in the flower bed from spilling into the grass.

In the past, landscape edging has been formed from lengths of wood or corrugated metal strips and such materials have served reasonably adequately. However, wood decays over a period of time, and metal has a tendency to rust, corrode, or to become bent and misshapen over time. Consequently, the most prevalent materials used for landscape edging today are inert synthetic plastics such as polyethylene and ethylene vinyl acetate. These materials are generally flexible and are therefore easily installed, while at the same time having an extended life expectancy that avoids the necessity of replacement at frequent intervals.

Although landscape edging formed from inert synthetic materials provides a better product because deterioration is avoided, problems nevertheless occur due to the environment in which the landscape edging is installed. More specifically, conventional edging normally consists of a longitudinally extending strip of material having a lower edge that is inserted into the ground to a predetermined depth, and an upper edge or rail that generally projects above the ground. The edging is typically installed by digging a narrow trench, inserting the lower edge to a predetermined depth, refilling the trench and compacting the earth around the edging. Such installation normally maintains the edging in its intended position for a period of time. However, the environment in which the landscape edging is placed usually works against its remaining in place over extended periods of time. More specifically, the edging may be walked on, bumped, kicked or otherwise engaged, and repeatedly driven over by lawn mowers or lawn tractors.

Equally severe to integrity and placement of landscape edging is freezing of the ground at and below the level of the edging during the winter months. The ground retains moisture in the fall, which freezes with dropping temperatures. Water is one of few materials having a coefficient of volume expansion that increases as temperature decreases, and the ground accordingly expands with frozen moisture in the winter. This has the effect of compressing the landscape edging, which can cause it to break as well as to become displaced.

As temperatures rise, the moisture beneath the ground surface melts, again changing the subsurface ground composition. As these seasonal temperature changes alternate, the landscape edging is repeatedly exposed to a variety of forces that, over the long term, cause it to become dislodged and damaged.

This invention is a result of an endeavor to design landscape edging that is no more complex from the structural standpoint than conventional edgings, but which will be initially anchored and remain in a stable position from season to season, thus extending its useful life.

The inventive edging comprises a longitudinally extending body that itself may take various forms, a longitudinal top rail extending along the upper edge of the body, and an anchoring member extending longitudinally along the lower edge of the body. In a preferred embodiment, the top rail is a tubular member of circular cross section that serves as a fluid conduit, permitting the use of various spray and sprinkler devices for watering plants adjacent the edging. The tubular member also assists to some extent in anchoring the upper edge above the surface of the ground by its rigidity and resistance to being bent over and broken, which is typical with edgings have straight top edges.

The primary feature of the invention resides in the anchoring member, which in the preferred embodiment takes the form an inverted, hollow triangle that extends along the lower edge of the body. The inverted triangle is symmetrically disposed relative to the body, so that equal portions project laterally from the opposed faces of the body. Two of the triangular legs converge into a downwardly projecting central point that extends directly below the edging body.

The inventive edging is conventionally installed. A trench is dug, and the edging is inserted into the trench with the anchoring member pointed downward. As the dirt is refilled and compacted around the edging body, it surrounds the anchoring member. The laterally projecting portions of the triangular anchor resist upward movement of the edging, particularly during the winter sub-surface freeze, and the symmetry of the projecting member resists lateral movement. As such, the landscape edging is strongly anchored, maintaining its structural integrity and remaining stationary over extended periods of time.

BRIEF DESCRIPTION OF THE DRAWINGS

FIG. 4 is a fragmentary perspective view of a second alternative embodiment of the landscape edging;

FIG. 5 is transverse sectional view taken along the line 5—5 of FIG. 4; and

FIG. 6 is a perspective fragmentary view of a third alternative embodiment of the inventive landscape edging.

DESCRIPTION OF THE PREFERRED EMBODIMENTS

Figure 1:
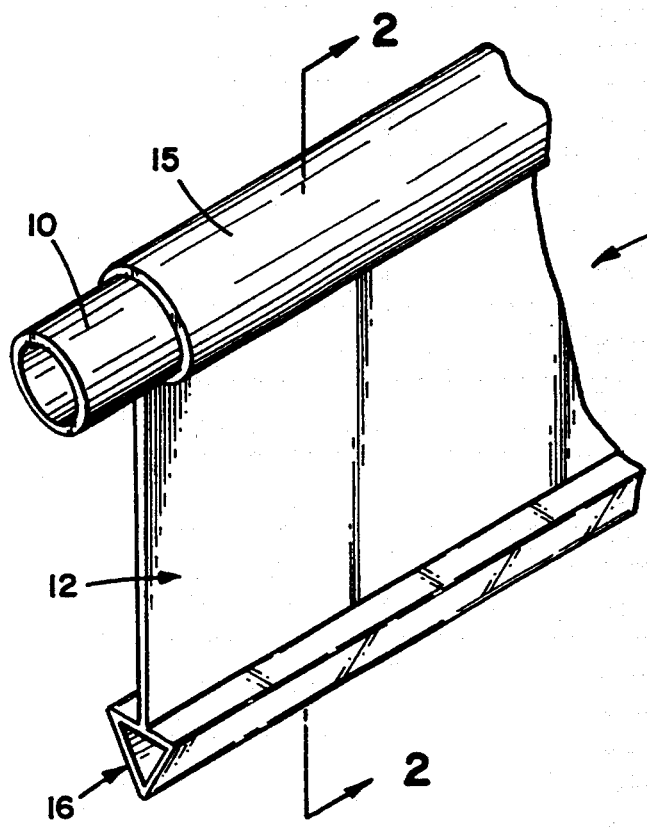
FIG. 1 is a fragmentary perspective view of the inventive landscape edging.
Figure 2:
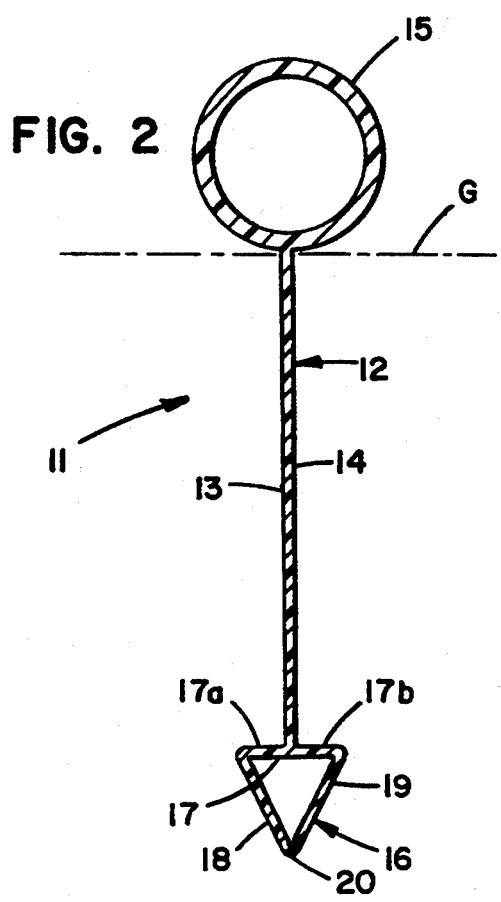
FIG. 2 is a transverse sectional view of the landscape edging taken along the line 2—2 of FIG. 1.

With initial reference to FIGS. 1 and 2, landscape edging embodying the invention is represented generally by the numeral 11. Edging 11 comprises a body 12 of predetermined length, height (or width) and thickness, and defining first and second opposed faces 13, 14. A top rail 15 extends longitudinally along the upper edge of body 12, and an anchoring member 16 extends longitudinally along its lower edge.

In the first preferred embodiment, body member 12 comprises a single planar strip of material joining the top rail 15 and anchoring member 16, which is intended to be disposed in a vertical position when installed.

As shown in FIG. 2, landscape edging 11 is intended to be installed with a first portion above the ground (reference letter G) and a second portion buried beneath the ground G. The preferred manner of installation for the first preferred embodiment is with the top rail 15 above the ground and the remainder of edging 11 below the ground.

Top rail member 15 comprises a continuous, hollow tubular member of circular configuration in the first embodiment. As such, the top rail 15 of one section of edging is adapted for connection with an adjacent section of edging by a tubular connector 10, the outer diameter of which permits a frictional fit into the top rail member 15 as shown in FIG. 1. Connector 10 not only provides a mechanical connection between adjacent strips of the edging 11, but also serves as a fluid connection to permit the flow of water through the top rail 15. Conventional spray fittings (not shown) may be inserted into the top rail 15 to permit spraying or sprinkling of water in areas adjacent the landscape edging 11.

Anchor member 16 extends longitudinally along the lower edge of body 12, and specifically takes the form of an inverted triangle when viewed in transverse cross section. As such, triangular anchoring member 16 includes a horizontal leg 17 and legs 18, 19 that converge to a point 20. Viewed from a broader perspective, anchoring member 16 comprises anchoring portions 17a, 17b that project laterally outward from the opposed faces 13, 14, respectively, and a pointed portion, defined by the converging legs 18, 19, that is intended for insertion into the ground.

In the preferred embodiment, the triangular anchoring member 16 is symmetrical relative to the body member 12, and for simplicity and economical manufacture, triangular anchoring member 16 is hollow.

Figure 3:
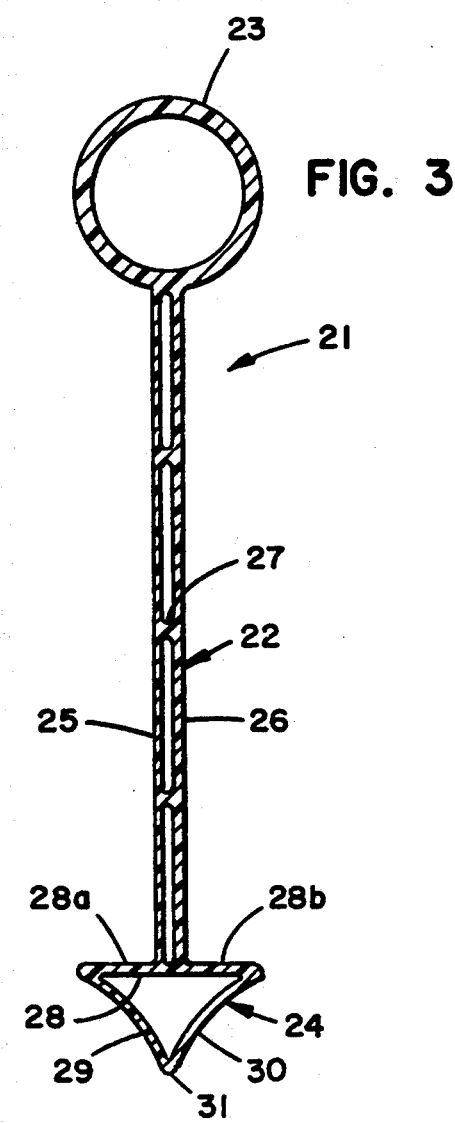
FIG. 3 is a transverse sectional view similar to FIG. 2 of a first alternative embodiment of the landscape edging.

In FIG. 3, an alternative embodiment of the landscape edging bears the general reference numeral 21, and comprises a body 22, top rail 23 and anchoring member 24. In this embodiment, body 22 comprises spaced vertical planar strips 25, 26 strengthened by spaced ribs 27.

The spaced double wall construction is structurally important for several reasons, one of which is the increased strength and rigidity of the body 22. Coupled with the beam-like functions provided by the anchoring member 24 and the tubular top rail 23, edging 21 is extremely strong and capable of performing an edging function over extended periods of time, even in climates where it is exposed to extremely low and high temperatures.

In addition, the double wall construction for the body 22 is important from the manufacturing standpoint to provide precision formed edging with uniformly flat surfaces. After the edging is extruded, it is vacuum sized in a vacuum calibrating tank to remove variations in height and thickness. In moving between such steps in manufacturing, the edging undergoes significant changes in cooling (e.g., on the order of 100° F.), which with conventional edging can cause twisting and distortion. The double wall construction of the body 22 not only better withstands such temperature changes, but also enables a significantly greater amount of vacuum to be used in the vacuum sizing process to create a more uniform and better product.

Top rail 23 is virtually the same as top rail 15, comprising of an elongated tube of circular cross section.

An anchoring member 24 is also a triangular configuration, comprises a horizontal leg 28 and legs 29, 30 that converge to a point 31. In this embodiment, the leg 28 is somewhat wider than the corresponding leg 17 of edging 11, and defines laterally projecting portions 28a, 28b. Legs 29, 30 of anchoring member 24 are slightly concave, as compared with the straight legs 18, 19 of anchoring member 16.

With reference to FIGS. 4 and 5, a second alternative embodiment of the inventive landscape edging is represented generally by the numeral 41. Edging 41 comprises a body 42 having a top rail 43 extending longitudinally along its upper edge and an anchoring member 44 running longitudinally along its lower edge. Rail number 43 and anchoring member 44 are essentially the same structurally as top rail 15 and anchoring member 16 of edging 11.

Body member 42 comprises a plurality of vertically extending corrugations extending between the top rail 43 and anchoring member 44. Corrugations 45a project laterally outward to the left when viewed in FIG. 4 and 5, and vertical corrugations 45b project laterally outward to the right in staggered or alternative relation to corrugations 45a. As best shown in FIG. 5, the corrugations 45a, 45b are spaced from the top rail 43 by a vertical segment 42a, and from the anchoring member 44 by a similar vertical segment 42b. The corrugations 45a, 45b are tapered in a converging manner as shown to each of the segments 42a, 42b.

The vertical corrugations 45a, 45b together provide increased strength for body member 42, both from the standpoint of vertical compressive strength as the edging 41 is inserted into the ground, and shear or bending strength to resist torsional or other lateral forces.

It is possible to incorporate structural configurations for the body member other than those shown to accomplish desired objectives. For example, it may be desirable to incorporate the configuration disclosed in U.S. Pat. No. 4,761,923, which permits adjacent strips of the edging to be structurally interlocked through overlapping for increased strength over the length of the assembled edging pieces.

A variation to the top rail of the edging is shown in FIG. 6. The edging shown in this figure is the same structurally as the edging 11 in all respects except the top rail, and the same reference numerals are therefore used. The top rail, which bears reference numeral 15', is transparent, and a low voltage line 51 carrying spaced lights 52 runs through top rail 15' to provide a visual effect or a light guiding function. For example, the edging 11' provided with such lighting may be placed adjacent a garden path or driveway so that, in evening hours, the path or driveway is easily seen. Top rail 15' may also be formed to be translucent, to diffuse the light emitted by spaced lights 52 to provide a continuous visual effect.

Edgings 11, 11', 21 and 41 are preferably formed from material that resists corrosion and other deterioration in the sub-ground surface environment (e.g., plastic). The design of each of the edgings 11, 21, 41 permits manufacture by continuous extrusion from plastic. The edgings are sold in finite lengths, either in roll form or straight strips.

In the use of edgings 11, 11', 21, 41, a trench is first dug in the ground, having a depth permitting insertion of the edging into the ground up to the top rail. The trench is then filled in, compacting the earth around the anchoring member. The lateral projections of the anchoring member prevent raising of the edging even where the frost line extends below the edging, and the triangular configuration also assists in preventing lateral movement of the anchoring member. In addition, the triangular configuration functions as a longitudinal beam along the bottom edge of the edging to provide strength and stability over extended periods of time.

As such, each embodiment of the inventive landscape edging is easily installed and inherently provides an anchoring function that resists loosening or movement from season to season, even in climates where significant sub ground freezing takes place.

What is claimed is:

1. Landscape edging comprising:
   an elongated body member of predetermined length, height and thickness and defining first and second opposed faces, the body member being insertable into the ground;
   a top rail member extending longitudinally along a top portion of the body member, the member comprising a tubular member formed from material capable of transmitting light; and
   lighting means disposed within the tubular top rail member for emitting light therefrom.

2. The landscape edging defined by claim 1, wherein the lighting means comprises:
   an electrical conductor extending through said tubular top rail member; and
   a plurality of spaced lights electrically connected to the electrical conductor.

3. The landscape edging defined by claim 2, wherein the tubular top rail member and said electrical conductor extend over the length of the body member, and said plurality of lights are spaced over the length of said tubular top rail member.

4. The landscape edging defined by claim 1, which further comprises an anchor member extending longitudinally along a bottom portion of the body member, the anchor member comprising portions that project laterally of said body member to anchor said second body member beneath the ground.

5. The landscape edging defined by claim 4, wherein the anchor member comprises a triangular member when viewed in transverse section to the body member, the triangular anchor member being disposed in an inverted position with a point of the triangle directed downward for insertion into the ground, and the triangular anchor member being further disposed so that portions thereof project laterally outward from the respective first and second opposed faces of said body member.

6. The landscape edging defined by claim 4, wherein the triangular anchor member extends over the length of the body member.

7. The landscape edging defined by claim 1, which further comprises connector means for joining the top rail member of adjacent strips of the landscape edging.

8. The landscape edging defined by claim 7, wherein the connector means comprises a tubular connector frictionally insertable into the top rail member of adjacent strips of the landscape edging.

9. The landscape edging defined by claim 1, wherein the top rail member is transparent.

10. The landscape edging defined by claim 1, wherein the top rail member is translucent.

11. The landscape edging defined by claim 1, wherein the tubular top rail member is of circular cross section.

12. The landscape edging defined by claim 1, wherein the body member comprises a single substantially planar strip of material.

13. The landscape edging defined by claim 1, wherein the body member comprises a pair of spaced planar strips interconnected by a plurality of ribs.

* * * * *